United States Patent Office 3,502,012
Patented Mar. 24, 1970

3,502,012
DEVICE FOR AUTOMATICALLY ROTATING A ROTARY SOCKET FOR FLASHBULBS
Hideo Takeuchi, Gamagori, Japan, assignor to Minalta Camera Kabushiki Kaisha, Minami-ku, Osaka, Japan
Filed July 10, 1968, Ser. No. 743,848
Claims priority, application Japan, July 15, 1967, 42/45,723
Int. Cl. G03b 9/70
U.S. Cl. 95—11.5                                7 Claims

ABSTRACT OF THE DISCLOSURE

A device for automatically rotating a rotary socket for a flash cube, having an operating plate with a socket rotating lever actuated only during low light conditions in response to movement of the shutter release lever. Downward movement of the shutter release lever allows a pointer-checking plate to move upward under spring bias to either contact the exposure meter pointer or, during low light conditions, fail to contact the pointer, in which case the plate continues to move upward and releases the operating plate for movement toward and contact with the rotary socket.

---

This invention relates to a device for automatically rotating a rotary socket built in a camera for mounting a plurality of flashbulbs to be ignited one by one.

In flashbulb photographing with a conventional camera, a flashbulb should be mounted on a socket each time when a photographer considers it necessary for instance in response to the warning given by an exposure meter. Instead of mounting a single flashbulb one by one, it has been proposed to mount a plurality of flashbulbs, such as flash cubes, on a camera. However, in any known camera, regardless of the number of flashbulbs to be mounted at a time, such flashbulbs are mounted only when flashbulb photographing is going to be carried out, and the flashbulbs as well as equipments therefor should be removed from the camera during daylight, or non-flashbulb, photographing.

An object of the present invention is to provide a device for automatically rotating a rotary socket built in a camera for igniting a plurality for flashbulbs mounted thereon one by one, so as to enable the provision of a camera capable of always carrying a plurality of and successively actuatable flashbulbs in the state as mounted on the camera. According to the present invention, a known electric circuit for actuating flashbulbs is utilized for igniting the flashbulb in the operating position only when the daylight is not sufficient to provide the minimum light quantity necessary for a particular film being used and for rotating the rotary socket automatically for preparing the camera ready for the succeeding flashbulb photographing.

Other objects and a fuller understanding of the present invention may be had by referring to the following description, taken in conjunction with the accompanying drawings, in which.

Like parts are designated by like numerals and symbols throughout the drawings.

Figure 1:
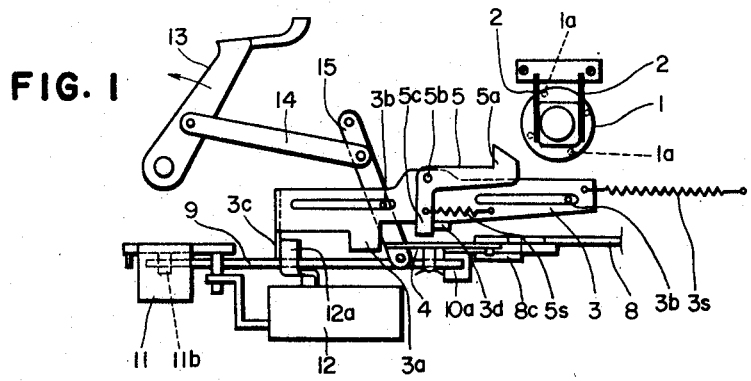
FIG. 1 is a schematic plan view of the device according to the present invention in the state with a shutter being charged.
Figure 2:
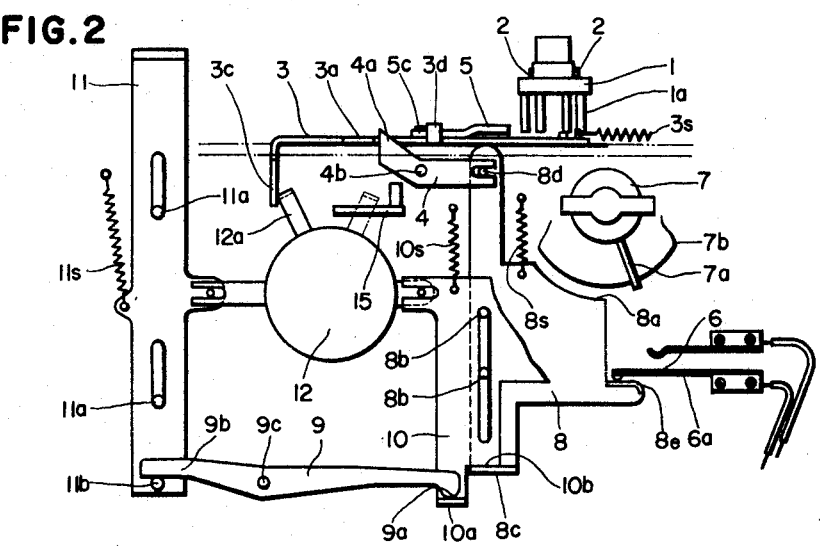
FIG. 2 is a schematic elevation of the device of FIG. 1.
Figure 3:
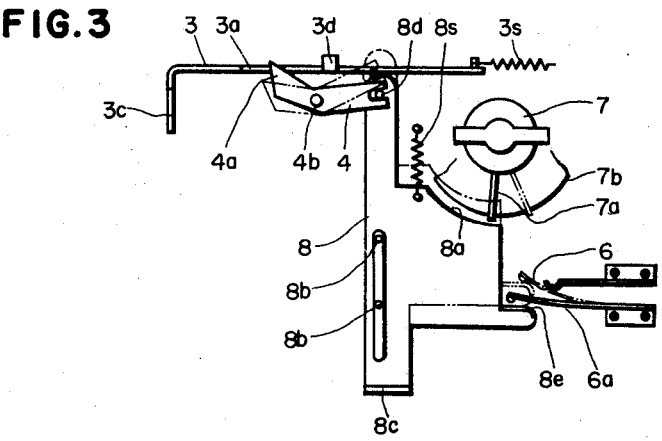
FIG. 3 is a partial schematic elevation, illustrating the function of an operating plate regulating member of the device.

Referring to FIGS. 1 to 3, a rotary socket 1 is rotatably mounted on the device frame which socket has a plurality of pins 1a planted thereto, and a positioning spring means 2 acts to normally dispose said socket and consequently each pin 1a of the socket at a predetermined angular position. An operating plate 3 has an elongated slot to engage with a fixed guide pin 3b, and a spring 3s is provided so as to normally bias the operating plate 3 rightwards as seen in the figures. A socket rotating lever 5 is pivotally secured to the operating plate 3 on a pivot 5b, and a claw 5 is formed at one end thereof so as to be engageable with one of the pins 1a of the socket 1. A spring 5s is provided so as to bias the socket rotating lever 5 on the pin 5b counter-clockwise, as seen in FIG. 1, so that the opposite end of the socket rotating lever 5 is kept in touch with an upright bent portion 3d formed on the operating plate 3.

The operating plate 3 has another bent piece 3c at the tail end thereof, which is engageable with the actuating lever 12a of a shutter actuating member 12. When the actuating lever 12a moves from its right hand position, as shown by dash-and-dot lines in FIG. 2, to its left hand position, as shown by solid lines in the figure, in response to the film winding motion of a film takeup lever 13 transmitted through a first and a second shutter connectors 14, 15, the actuating lever 12a forces the operating plate 3 leftwards against the spring 3s.

A shutter release lever 11 is supported by stationary guide pins 11a so as to reciprocate vertically, while being biased upwards by a spring 11s. A pin 11b is secured to the lower end of the shutter release lever 11, so that the downward movement of the shutter release lever 11 is transmitted to a pointer-checking plate 8 through first and second release connectors 9 and 10, respectively. The first release connector 9 is pivotally supported by a stationary pin 9c at the central portion thereof, and the left hand end 9b of the connector 9 engages the pin 11b mounted on the release lever 11, while the opposite and right hand end 9a of the connector 9 engages a bent portion 10a of the second release connector 10. A spring 10s biases the second release connector 10 upwards under the guidance of guide pins 8b. A step portion 10b is formed at the lower end of the second release connector 10, which engages a bent portion 8c of the pointer-checking plate 8.

The pointer-checking plate 8 reciprocates vertically under the guidance of the guide pins 8b, and a spring 8s biases the pointer-checking plate 8 upwards. The pointer-checking plate 8 has a pin 8d secured to the upper end thereof so as to fit in the bifurcated end portion of an operating plate regulating lever 4, a pointer-checking switch-actuating lug 8e formed at the lower right corner thereof so as to actuate a synchro-main-switch 6. The operating plate regulating lever 4 is pivotally supported by a shaft 4b and related to the pointer-checking plate 8 in the aforesaid manner through the bifurcated end thereof, and the opposite end 4a of the lever 4 is engageable with a lug 3a of the operating plate 3.

The pointer-checking portion 8a of the pointer-checking plate 8 is so constructed that when the pointer-checking plate 8 is raised, the pointer-checking portion 8a intersects with the locus of the movement of the pointer 7a of an exposure meter 7. For instance, when a photographic object is bright enough to allow daylight photographing, the pointer 7a is at a position, as shown by the solid lines in FIG. 3, and hence, the pointer-checking portion 8a of the pointer-checking plate 8 engages a bent portion of the pointer 7a and holds the pointer 7a at such angular position by urging it against a stationary member 7b. In other words, the pointer-checking plate 8 is so constructed that when the daylight photographing is possible, the pointer 7a occupies such position as to prevent the upward movement of the pointer-checking plate 8 beyond the locus of the pointer movement.

On the other hand, when the brightness of a photographic object is too low to allow daylight photographing, the pointer 7a occupies a position as shown by dash-and-dot lines in FIG. 3 (solid lines in FIG. 2), and hence, the pointer-checking plate 8 is raised without engaging the pointer 7a, in response to the actuation of the shutter release lever 11.

As long as the pointer 7a engages the pointer-checking portion 8a, the operating plate regulating lever 4 is held at a position as shown by solid lines in FIG. 3, so that the left hand end 4a of the lever 4 engages with the lug 3a to prevent the rightward movement of the operating plate 3. However, when the pointer 7a is at such position that the pointer-checking plate 8 moves upwards without engaging the pointer 7a, the operating plate regulating lever 4 is rotated counter-clockwise by the engagement between the bifurcated portion of the lever 4 and the pin 8d secured to the pointer-checking plate 8, and hence, the left hand end 4a of the lever 4 moves below the lug 3a of the operating plate 3 (as shown by dash-and-dot lines in FIG. 3), so as to allow the rightward movement of the operating plate 3 without the limitation of the regulating lever 4. When the pointer-checking plate 8 is thus raised without engaging the pointer 7a, the switch-actuating lug 8e engages with the actuator 6a of the synchro-main-switch 6 and closes the switch 6. In other words, the synchro-main-switch 6 is closed only when flashbulb photographing is undertaken.

With the device of the aforesaid construction, when the film take-up lever 13 is turned counter-clockwise, as shown by the arrow in FIG. 1, the film is rolled up, and at the same time, the shutter actuating lever 12a moves from the dash-and-dot lines position to the solid lines position of FIG. 2, so as to charge a shutter. If the operating plate 3 should be positioned to the right of the position as shown in FIGS. 1 and 2 when the shutter actuating lever 12a makes such movement, the operating plate 3 is forced leftwards against the spring 3s to the position as shown in the figures by the engagement between the lever 12a and the bent piece 3c of the plate 3.

Figure 6:
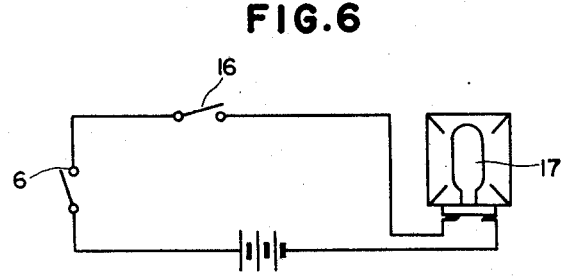
FIG. 6 is an electric circuit diagram to be used in the device of the present invention for actuating a flashbulb.

As pointed above, when the light quantity of the daylight or other external light is so low as to necessitate the use of the flashbulb, the pointer 7a of the exposure meter 7 is at a position as shown in FIG. 2 (dash-and-dot line position in FIG. 3). Under such conditions, if the shutter release lever 11 is depressed, the shutter actuating lever 12a begins to move rightwards, as seen in FIG. 2, to the dash-and-dot line position. The second release connector 10 is raised by the spring 10s, responsive to the depression of the shutter release lever 11, through the first release connector 9, and accordingly, the pointer-checking plate 8 is also raised by the spring 8s as the second release connector 10 moves upwards with the step portion 10b of the connector kept in contact with the bent portion 8c of the pointer-checking plate 8. Thus, the pointer-checking plate 8 moves upwards from the lowered position, as shown in FIG. 2, to the raised position, as shown by dash-and-dot lines in FIG. 3, and the end portion 4a of the operating plate regulating lever 4 is forced to come below the lug 3a of the operating plate 3 to allow the rightward movement of the operating plate 3 caused by the spring 3s. At the same time, the synchro-main-switch 6 is closed. A switch 16, as depicted in the circuit diagram of FIG. 6, is now closed responsive to the depression of the shutter release lever 11, so that a flashbulb 17 is energized to flash.

When the depression acting on the shutter release lever 11 is removed upon completion of a flashbulb photographing operation, the shutter release lever 11 is pulled upwards by the spring 11s. Thereby, both the second release connector 10 and the pointer-checking plate 8 are forced downwards by the shutter release lever 11 through the first release connector 9, so that the operating plate regulating lever 4 returns to the position as shown in FIG. 2 and the synchro-main-switch 6 opens.

When the operating plate 3 is pulled rightwards by the spring 3s, the claw 5a of the socket rotating lever 5, pivotally secured to the operating plate 3, comes into contact with the pin 1a of the rotary socket 1. Due to the pivotally support of the socket rotating lever 5 by the shaft 5b secured to the operating plate 3 and the sloped upper edge of the claw 5a, the socket rotating lever 5 is turned clockwise, as seen in FIG. 1, against the spring 5s as the operating plate 3 travels rightwards. As soon as the sloped upper edge of the claw 5a passes through the pin 1a of the rotary socket 1, the socket rotating lever 5 returns to its original angular position by the elastic force of the spring 5s. In other words, the claw 5a is moved to the right hand of the pin 1a of the rotary socket 1, as seen in FIG. 1.

When the film take-up lever 13 is turned counter-clockwise, as shown by the arrow of FIG. 1, for preparing for the succeeding photographing operation, the shutter actuating lever 12a moves from the dash-and-dot line position to the solid line position of FIG. 2. Thereby, the operating plate 3 is forced leftwards by the engagement between the shutter actuating lever 12a and the bent piece 3c of the operating plate 3. Responsive to such leftward movement of the operating plate 3, the claw 5a of the socket rotating lever 5 acts to pull one of the pins 1a of the rotary socket 1 to effect a predetermined angular displacement of the socket 1, and then leaves the rotary socket 1 and returns to the position as shown in FIG. 1. The positioning spring 2, associated with the rotary socket 1 acts to set the rotary socket 1 at a predetermined angular position after the angular displacement caused by the claw 5a. Thus, a rotating operation of the rotary socket 1 is completed.

When the operating plate 3 returns leftwards, the lug 3a of the operating plate 3 rides across the end portion 4a of the operating plate regulating lever 4, so that upon completion of the return, the lug 3a is in operative engagement with the end portion 4a, as illustrated in FIGS. 1 and 2.

If the pointer 7a of the exposure meter 7 is at a position corresponding to the brightness sufficient for daylight or external light photographing without flashbulbs, as shown by dash-and-dot lines in FIG. 3, upon depression of the shutter release lever 11, the pointer checking portion 8a of the pointer-checking plate 8 comes into contact with the bent portion (not shown) of the pointer 7a to prevent any further upward movement of the pointer-checking plate 8, as described hereinbefore. Accordingly, the end portion 4a of the operating plate regulating lever 4 is kept in contact with the lug 3a of the operating plate 3, so as to hamper the rightward movement of the operating plate 3, even when the shutter actuating lever 12a moves rightwards. The synchro-main-switch 6 is also kept open. Therefore, the flashbulb 17 is not energized, and does not flash.

When the film take-up lever 13 is turned counter-clockwise upon completion of the daylight photographing for taking up the film and charging the shutter, the shutter actuating lever moves leftwards, without causing any movement of the operating plate 3 and the rotary socket 1.

In the preceding embodiment, the rotation of rotary socket to a predetermined angular position is carried out in conjunction with a shutter charging operation (or film taking up operation). It is, of course, possible to rotate the rotary socket by using the returning or rising movement of a shutter release button or a shutter release lever upon completion of a shutter releasing operation, as will be described in hereinafter referring to FIGS. 4 and 5.

Figure 4:
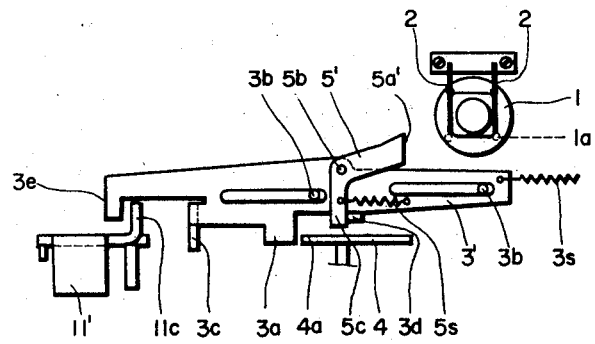
FIG. 4 is a schematic plan view of a different embodiment of the present invention, showing the essential portions thereof.
Figure 5:
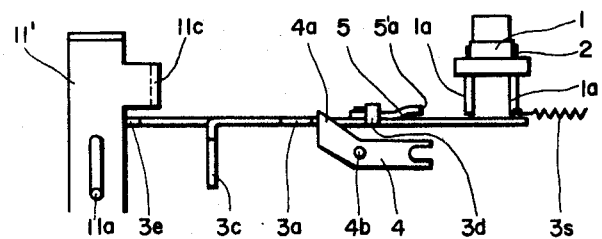
FIG. 5 is a schematic elevation of the device of FIG. 4.

In FIGS. 4 and 5, a socket rotating lever 5' is pivotally mounted on an operating plate 3', and the actuating end portion 5a' is adapted to push a pin 1a of a rotary socket 1 when the operating plate 3' moves rightwards. In addition to a bent piece 3c engageable with a shutter actuating lever 12a, corresponding to the similarly numbered parts of the preceding embodiment, the operating plate 3' of this embodiment has a hook portion 3e extended to the proximity of a shutter release lever 11'. A hook-like arm 11c integrally formed on the shutter release lever 11' engages with said hook portion 3e only when the shutter release lever 11' is depressed. The rest of the structure and components of this embodiment are substantially the same as the corresponding portions of the preceding embodiment, and hence, detailed description thereof will not be repeated here.

As in the case of the preceding embodiment, described in detail referring to FIGS. 1 to 3, during daylight or external light photographing without necessitating the use of flashbulb, the operating plate 3' does not move rightwards due to the engagement between a lug 3a and an operating plate regulating lever 4, even when the shutter release lever 11' is actuated. Thus, the rotary socket 1 is not rotated, and a synchro-main-switch 6 is kept open, as seen from FIG. 2.

On the other hand, during the flashbulb photographing, upon depression of the shutter release lever 11', a pointer-checking plate 8 move upwards without coming into contact with the pointer 7a of an exposure meter, as seen from the preceding embodiment described hereinbefore referring to FIGS. 1 to 3. Thereby, the operating end 4a of the operating plate regulating lever 4 moves below the lug 3a of the operating plate 3', and the synchro-main-switch 6 is closed to energize a flashbulb 17, as shown in IFG. 3. In this particular embodiment, as depicted in FIGS. 4 and 5, upon depression of the shutter release lever 11', the hook-like portion 11c of the lever 11' comes to a position where the hook-like portion 11c is engageable with the hook portion 3e at the tail end of the operating plate 3', and hence, the rightward movement of the operating plate 3' is hampered at the beginning of the movement of the lever 11' by the engagement between the hook-like portion 11c and the hook portion 3e, even though the end portion 4a of the operating plate regulating lever 4 is away from the lug 3 of the operating plate 3'. When the shutter release lever 11' moves upwards upon completion of a flashbulb photographing operation, the hook-like portion 11c moves away from the aforesaid position engageable with the hook portion 3e of the operating plate 3', so that the operating plate 3' moves rightwards by a spring 3s just before the pointer-checking plate 8 is brought downwards. The socket rotating lever 5' pivoted to the operating plate 3' urges a pin 1a of the rotary socket 1 by the operating end portion or claw 5a' thereof, in response to the rightward movement of the operating plate 3'. The rotary socket 1 is thus rotated and comes to a predetermined angular position by the action of a positioning spring means 2, after the aforesaid actuation or rotation by the soket rotating lever 5'. Then, as the film take-up lever 13 is turned counter-clockwise for preparing for the succeeding photographing operation, the shutter actuating lever 12a urges a bent piece 3c of the operating plate 3' leftwards, so that the operating plate 3' returns leftwards against the spring 3s to the original position, as shown in FIGS. 4 and 5.

The device of the present invention can be also applied to the so-called spring-drive type film take-up and shutter charging mechanism.

As described in the foregoing, according to the present invention, there is provided a device for automatically rotating a rotary socket of a repeatedly actuatable flashbulb, by adding only a small number of parts to a known device for rotating the rotary socket. Thereby, the need of removing a used flashbulb and mounting a fresh flashbulb for each flashbulb photographing operation is eliminated, and a very convenient automatic flash photographing system is provided.

Although the present invention has been described with a certain degree of particularity, it is understood that the present disclosure has been made only by way of example and various changes or modifications in the details of construction and the combination and arrangement of parts may be resorted to without departing from the spirit and the scope of the present invention as hereinafter claimed.

What is claimed is:

1. A device for automatically rotating a socket mounting a plurality of flashbulbs to be ignited one by one and mounted in a camera comprising a shutter driving means, a shutter releasing means, a pointer of the exposure meter, a socket for mounting a plurality of flashbulbs around the circumference theerof at the equal angular intervals and adapted to be rotated by each such angle with aid of a spring means so as to bring each of said flashbulbs successively to a position ready for ignition, and an electric circuit having a switch and an electric source whereby when said switch is closed in response to the movement of said shutter driving means the flashbulb at said position may be ignited, which device is characterized by comprising a first means adapted to be moved against the force of a spring means in a direction normal to the axis of said socket accompanied by the movement of said shutter driving means when the latter is loaded and to engage with said socket to rotate the same by said angle during the movement of said first means in one direction; a second means adapted to be movable in one direction with the action of a spring means upon actuation of said shutter release means when said exposure meter pointer occupies any position showing necessity of flash but not to be moved when said exposure meter pointer occupies any position showing unnecessity of flash owing to the abutment of said second means with said pointer, said second means being movable in the other direction against the force of said second spring means accompanied by the movement of said shutter release means back to the initial and normal position with the action of a spring means when the actuation of said shutter release means is freed; third means provided between said first and second means so as to normally engage with said first means to hold the same against the force of said first spring means but release said engagement when said second means is moved in said one direction; and a second electric switch means provided in said circuit in addition to the first occurring switch and adapted to be closed when said second means is moved in said one direction to ignite the flashbulb at the operating position.

2. A device as set forth in said claim 1 in which said first means is a plate member having a projection to engage with an arm of said shutter driving means whereby upon loading of said shutter driving means to rotate in one direction said arm forcingly accompanies said plate member to move against the force of said first spring means.

3. A device as set forth in said claim 2 in which said socket has a plurality of pins planted downwardly thereto of which number and position corresponds to those of the flashbulbs mounted on said socket, and said plate member has further a substantially L-shaped two arm lever pivoted at the bent portion thereof on said plate member, one arm of said lever being connected with one end of a spring means of which other end is fixed to said plate member so that a head of the other arm of said lever may engage with one of said pins to rotate the socket during the movement of said plate member in said one direction.

4. A device as set forth in said claim 3 in which said head of the other arm of the lever is so formed that when said head abuts to said socket pin during the movement of said plate member with the action of said spring means therefor to clear said pin by pivotal movement of said L-shaped lever against said spring means therefor, said movement of said plate member being started when said shutter release means is actuated to be lowered downwardly which causes movement of said second means in said one direction with the action of said spring means therefor to release said engagement of said third means with said plate member whereby when said plate member is moved against the force of said first spring means therefor upon loading of said shutter driving means said head of the lever forcingly accompanies said pin to rotate by a predetermined angle with aid of said socket positioning spring means.

5. A device as set forth in said claim 3 in which said plate member has, in addition to said projection to engage with the arm of the shutter driving means, a second projection at the tail end thereof to engage with an arm provided on said shutter release means only when said shutter release means is actuated to be lowered downwardly against the force of said spring means therefor, and said head of the other arm of the lever is so formed that when abutting to one of said pins during the movement of said plate member with action of said spring means therefor, which movement can not be started even if said shutter release means is actuated to be lowered downwardly due to engagement of said second projection of the plate member with said arm of the shutter release means but started when said shutter release means is freed, said head may urge one of said pins to rotate said socket and clear the adjacent pin by pivotal movement of said L-shaped lever against said spring means therefor to allow the movement of said plate member against the force of said first spring means therefor.

6. A device as set forth in said claim 1 in which said second means is a plate member having a projection to engage with one of the contacts of said second electric switch means, when said second plate member is caused to move in said one direction with the action of said second spring means therefor upon actuation of said shutter release means to lower downwardly, to close said second switch for igniting the flashbulb at the operating position, and further having a curved face to abut with the exposure meter pointer when said pointer occupies any position showing unnecessity of flash so as to prevent said second plate member from being moved in said one direction but to be free from said pointer when said pointer occupies any position showing necessity of flash so as to allow said second plate member being moved in said one direction.

7. A device as set forth in said claim 6 in which said second means has a pin planted thereto to engage with a recess of the bifurcated end of said third means in the form of Bell-crank lever of which other end is engaged with a further projection of said first plate member so that when said second plate member is moved in said one direction said engagement of said Bell-crank lever with said further projection of the first plate member is freed.

References Cited

UNITED STATES PATENTS 3,127,824   4/1964   Williams _____ 95—11 X
3,443,496   5/1969   Sauer et al. _____ 95—11

FOREIGN PATENTS 1,238,327   4/1967   Germany.

NORTON ANSHER, Primary Examiner

ROBERT WAYNE ADAMS, Assistant Examiner